United States Patent [19]

Comroe et al.

[11] Patent Number: 4,833,701
[45] Date of Patent: May 23, 1989

[54] TRUNKED COMMUNICATION SYSTEM WITH NATIONWIDE ROAMING CAPABILITY

[75] Inventors: Richard A. Comroe, Dundee; Kenneth J. Zdunek, Schaumburg, both of Ill.

[73] Assignee: Motorola, Inc., Schaumburg, Ill.

[21] Appl. No.: 149,245

[22] Filed: Jan. 27, 1988

[51] Int. Cl.[4] .............................................. H04Q 7/04
[52] U.S. Cl. ........................................ 379/60; 455/33
[58] Field of Search ....................... 379/57, 58, 59, 60, 379/63; 455/54, 56, 33, 34, 12; 340/825.44, 825.54, 311.1, 313

[56] References Cited

U.S. PATENT DOCUMENTS

| | | | |
|---|---|---|---|
| 3,898,390 | 8/1975 | Wells et al. | |
| 4,012,597 | 3/1977 | Lynk, Jr. et al. | |
| 4,178,476 | 12/1979 | Frost | |
| 4,233,473 | 11/1980 | Frost | |
| 4,562,572 | 12/1985 | Goldman et al. | |
| 4,573,206 | 2/1986 | Gravel et al. | 455/33 |
| 4,578,815 | 3/1986 | Persinotti | |
| 4,612,415 | 9/1986 | Zdunek et al. | |
| 4,646,345 | 2/1987 | Zouner | 379/62 |
| 4,651,156 | 3/1987 | Martinez | |
| 4,658,416 | 4/1987 | Tanaka | 379/57 |
| 4,670,090 | 6/1987 | Sandvos et al. | |
| 4,670,899 | 6/1987 | Brody et al. | |
| 4,672,601 | 6/1987 | Ablay | |
| 4,700,374 | 10/1987 | Bini | |
| 4,723,264 | 2/1988 | Sasuta | 379/58 |
| 4,737,977 | 4/1988 | Norman | 379/58 |
| 4,737,978 | 4/1988 | Burke et al. | 379/60 |
| 4,748,655 | 5/1988 | Thrower et al. | 379/60 |

FOREIGN PATENT DOCUMENTS

| | | | |
|---|---|---|---|
| 0111972 | 6/1984 | European Pat. Off. | 379/60 |
| 0114016 | 9/1979 | Japan | 379/57 |
| 0191540 | 11/1983 | Japan | 379/61 |
| 0103834 | 7/1985 | Japan | 379/57 |
| 0177039 | 8/1986 | Japan | 379/60 |
| 0186056 | 8/1986 | Japan | 379/57 |

Primary Examiner—Robert Lev
Attorney, Agent, or Firm—Thomas G. Berry

[57] ABSTRACT

Selected regional trunking systems are equipped with telephone interconnect capability and provided with local computers (106), which communicate with a national hub computer (110). At each selected trunking system, several IDs are reserved as "roaming IDs" to be temporarily assigned to roaming subscribers (112). When a subscriber determines that it has roamed into a new trunked system, it requests a roaming ID. A roaming ID is assigned and transmitted to the subscriber, which thereafter operates within the new trunked system using its roaming ID. The roaming assignment is also transmitted to the national hub computer (110) so that interconnect calls may be approximately properly forwarded. The roaming subscriber (112) continues to operate under the assigned roaming ID until it roams out of the range of the current system and into yet another trunked system. In this way, the subscribers may roam from system to system.

11 Claims, 5 Drawing Sheets

TRUNKED COMMUNICATION SYSTEM WITH NATIONWIDE ROAMING CAPABILITY

TECHNICAL FIELD

This invention relates generally to trunked communication systems, and more particularly to trunked communication systems which enable subscriber units to roam from system to system, and is more particularly directed toward a trunked communication system having nationwide roaming capability.

BACKGROUND ART

Trunked communication systems are known. In a typical trunked system, a central controller allocates a limited number of communication channels among a plurality of subscriber units. Generally, a subscriber may be a mobile unit, portable unit or a control station. As used herein, a mobile unit is a trunked subscriber unit designed to be installed in a vehicle, a portable unit is a trunked subscriber unit designed to be carried on or about the person, and a control station is a trunked subscriber unit design to be permanently or semi-permanently installed in a building or other fixed location.

Each subscriber has an identification (ID) code, which, together with other information, comprises a call request that is transmitted to the central controller thereby indicating that the subscriber desires access to one of the communication channels. Normally, the call request is encoded with error correcting or other codes to form inbound signalling words (ISWs) to facilitate communications. The subscriber ISWs are transmitted to the central controller over a selected one of the communication channels. This channel is commonly referred to as the control channel. Generally, the particular communication channel used as the control channel is periodically changed as a control measure.

When not participating in a call, each subscriber monitors the control channel. When the central receives the call request ISW from a requesting (i.e., the calling) subscriber, it returns a channel grant outbound signalling word (OSW) if a channel is available. Upon receipt of the channel grant OSW, both the calling subscriber and the called subscriber(s) leave the control channel and move to the assigned communication channel to participate in the call. If, however, all the channels are in use, the central controller returns a "Busy" OSW and the subscriber must wait until a channel becomes available.

In addition to subscriber-to-subscriber calls, it is known to interconnect the trunked communication system with the public telephone system. Generally, the central controller must be programmed to recognize that the subscriber's ID is authorized for such interconnect service. In this way, an authorized trunked subscriber can receive and initiate interconnect calls with "land line" (i.e., private homes or offices) parties.

The communication range of a trunked system, while dependent on transmitter power and other factors, is generally twenty (20) miles (i.e., a system diameter of forty (40) miles). Within range, it is manifest that the mobile and portable subscribers may roam at will. If a subscriber should roam outside the range the trunked system, the subscriber would "lose" (i.e., be unable to receive) the control channel. In such cases, communication is not possible.

Clearly, contemporary trunked communication systems presuppose that intra-system roaming completely serves the needs of the subscribers. Generally, this assumption may be valid for the subscriber that travels locally between home and office, or from one local customer to the next. However, preventing inter-system roaming inherently limits and dis-serves the needs of several other types of subscribers. Examples of such other subscribers include, but are not limited to, statewide, multi-stage, or regional sales, service, or law enforcement organizations, and medium or long range trucking or carrier companies. In fact, as a general statement, any subscriber that has a more than an infrequent need to travel beyond the communication range of its home trunking system could benefit by inter-system roaming.

SUMMARY OF THE INVENTION

Accordingly, it is an object of the present invention to provide an improved trunked communication system.

It is another object of the present invention to provide for inter-system roaming of subscribers.

It is a further object of the present invention to provide for nationwide roaming of trunked subscribers.

It is yet another object of the present invention to provide location information on roaming subscribers.

It is yet a further object of the present invention to automatically forward interconnect calls to a roaming subscriber irrespective of which trunked system the subscriber is currently operating within.

Briefly, according to the invention, selected regional trunked systems are equipped with telephone interconnect capability and provided with local computers, which communicate with a national hub computer. The trunked systems are selected such that the selected systems in each region form a communication network, which preferably is nationwide in scope. At each selected trunked system, several IDs are reserved as "roaming IDs" to be temporarily assigned to roaming subscribers. When a subscriber determines that it has roamed into a new trunked system, it requests a roaming ID. A roaming ID is assigned and transmitted to the subscriber, which thereafter operates within the new trunked system using the roaming ID. The roaming assignment is transmitted to the national hub computer so that interconnect calls may be properly forwarded. The roaming subscriber continues to operate under the assigned roaming ID until it roams out of the range of the current system and into yet another trunked system. In this way, the subscribers may roam from system to system.

DETAILED DESCRIPTION OF THE PREFERRED EMBODIMENT

Figure 1:
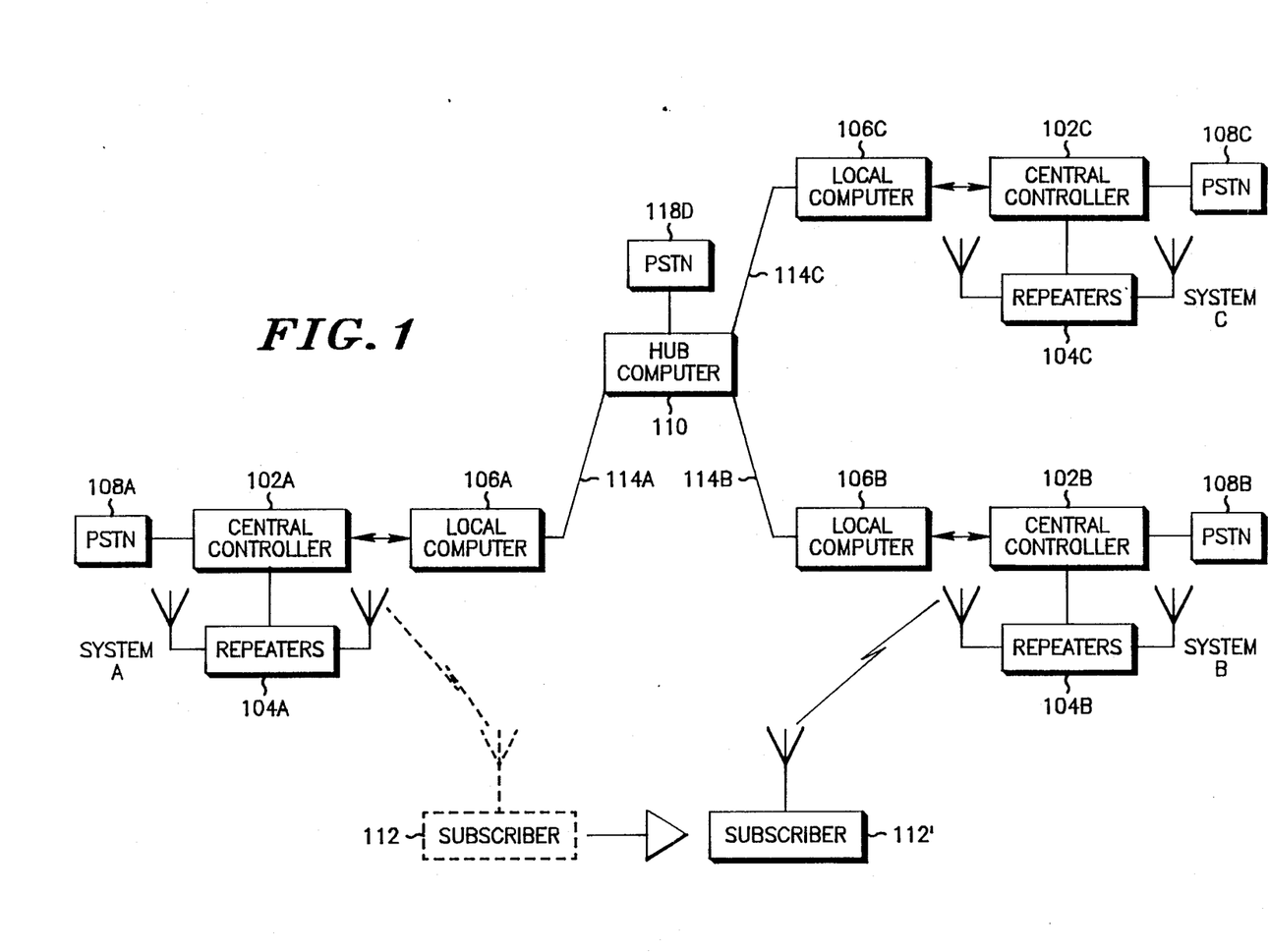
FIG. 1 is a block diagram of the networked trunked communication system supporting roaming.

Referring now to FIG. 1, three trunked communication systems (A, B, and C) are coupled to a central hub computer (110). Preferably, each of the trunking systems (A, B, and C) include a central controller (102a–c), which allocates several repeaters (104a–c) among a plurality of subscriber units. Each of the central controllers is also coupled to a local computer (106a–c), which performs several administrative functions including, but not limited to, allocating and assigning roaming ID codes, communicating and requesting status information to and from the hub computer (110), and dynamically reprogramming the roaming subscriber units so that they may operate within any systems. Preferably, the central controllers (102a–c) are also coupled to the local public switched telephone network (PSTN) (108a–c) so that telephone interconnect calls can be established between the subscribers and landline parties.

Each of the local computers (106a–c) are coupled to the centralized hub computer (110), which operates as the central data collection and information retrieval point for the networked system (100). In the preferred embodiment of the present invention, it is envisioned to have a single hub computer for the entire continental United States. The local computers (106a–c) may be coupled (114a–c) to the hub computer (110) by any suitable means, including leased telco lines, microwave link, or any other suitable data communication channel. Alternately, if suitable bandwidth and transmission time are available, the local computers (106a–c) may communicate with the hub computer (110) via the public switched telephone networks (108a–d).

Each subscriber unit operating within a local trunked communication system (A, B, or C) has stored therein a unit identification (ID) code, and the ID code of its "home" system. While the subscriber unit (112) resides and operates within its "home" system, a subscriber may request and receive communication channels by transmitting its unit ID code to the "home" central controller (i.e., either 102a, 102b, or 102c) as a call request. The subscriber units will operate within the "home" system as long as it continues to receive the "home" system's control channel.

When a subscriber roams to the fringe of a local communication system's range, the subscriber will experience OSW decoding errors as the control channel information becomes weaker. At a suitable threshold point, the subscriber unit may determine that the errors are so great that it is no longer properly receiving its "home" control channel.

To maintain communication, (i.e., roam) the subscriber (112') may begin scanning the available channels in search of a new control channel. Typically, subscriber units may easily identify a control channel due to the continuous nature of transmission of outbound signalling words (OSW's) transmitted by the central controllers (102a–c). Upon finding a new control channel, the subscriber unit waits a suitable period of time to determine whether the newly identified control channel supports roaming. Preferably, only one trunked system within any metropolitan area (or region) will be selected to be part of the roaming network (100). This limitation is desirable since within any particular metropolitan area there may be several trunked systems (both private and commercial). According to the present invention, a trunked central controller that supports roaming may periodically transmit a roaming support message interleaved among the outbound signalling words. Upon receiving the roaming support code word, the roaming subscriber (112') may attempt to "register" on that system as a roaming subscriber by transmitting a roaming request code.

Upon receipt of the roaming request code, the central controller may interact with its local computer to determine if there are any roaming ID's are available. According to the present invention, a subset of the available ID codes on a trunked communication system are reserved as roaming IDs. In any particular implementation this may be a fixed subset of the ID codes, or the size of the subset may be dynamically altered depending upon the loading of the particular trunked system. Assuming that a roaming ID is available, the local computer may establish a cross-reference between the subscriber's unit ID and home system ID to the roaming ID that will be assigned to the subscriber. The roaming ID is returned to the subscriber, which thereafter operates within the new system using the roaming ID. The home system and unit ID of the roaming subscriber (112') are forwarded to the hub computer (110), maintains a record of which system a roaming subscriber is operating upon. In this way, billing information may be properly forwarded to the roaming subscriber (112'). Also, a centralized repository of information is automatically generated so that a dispatcher of any local system may query the hub computer (110) to find out which system its subscriber is registered (operating) upon.

Assuming now that a subscriber (112) (which has system A as its "home" system) roams into system B, the subscriber (112') may transmit its roaming request to central controller system B to attempt to register as a roaming subscriber. If successful, the hub computer (110) will be updated to reflect that the subscriber (112') is now operating in system B. Should the dispatcher of system A desire to contact the subscriber (112'), she may contact the hub computer (110) by the PSTN (or optionally by directing a query to the central controller and the local computer of the home system). In this way, the dispatcher may determine which system the subscriber (112') is operating (registered) upon, and receive the telephone number of that system's central controller (102b) to use to establish a telephone interconnect call. Thus, a dispatcher in Milwaukee, Wis., may be informed that its subscriber is operating within the Chicago trunked system, and, after placing a telephone call to the Chicago trunked central controller, establish communication with the subscriber. In this way, dispatchers may communicate with its subscribers using the public switch telephone network as the long-distance carrier, and communicate by wireless communication over whichever trunked communication system that the subscriber (112') has roamed into.

Should the subscriber (112') now roam into system C, the registration process would be repeated and the hub computer (110) would be informed that the subscriber has roamed into system C. Upon storing and cross-referencing this information, the hub computer (110) would determine that the roaming subscriber no longer requires the roaming ID for system B. Accordingly, the hub computer would thereafter contact the local computer (106b) informing it that the subscriber's roaming ID is no longer required. In this way, roaming ID's may be reallocated for use to other roaming subscribers.

Figure 2:
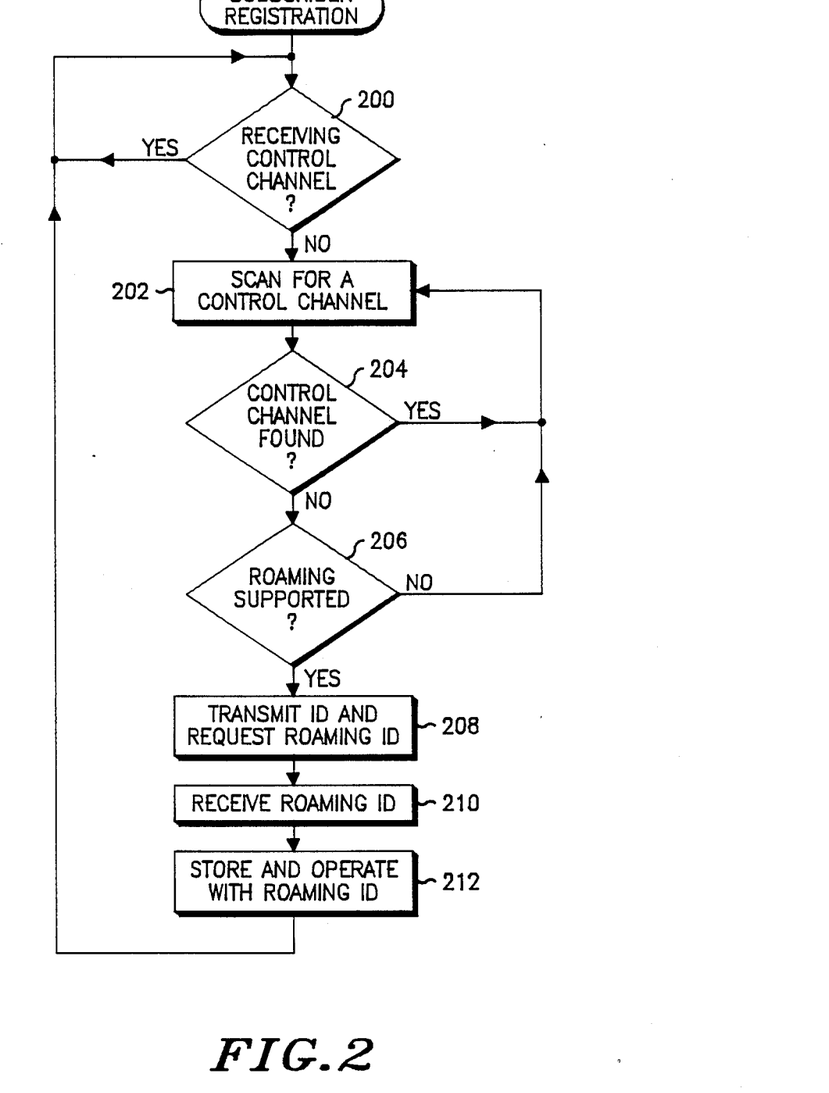
FIG. 2 is a flow diagram illustrating the steps executed by a roaming subscriber to obtain a roaming ID.

Referring now to FIG. 2, a flow diagram illustrating the steps executed by a roaming subscriber to register on a new trunked system is shown. In decision 200, the subscriber determines whether it is receiving a control channel. So long as the subscriber determines that it is receiving a control channel, it will operate in that system whether it is its "home" system or a roaming system. When the subscriber has determined that it is no longer receiving a control channel, the routine proceeds to step 202, where the subscriber scans for a control channel. The subscriber may scan for the control channel in any suitable manner, including scanning every single available channel, or scanning an identified subset of control channel frequencies, or, the subscriber may be informed by additional information in the roaming support code word transmitted by a roaming supportive system of the control channels of each adjacent system that a subscriber could roam into. In this way, a relatively few number of channels would have to be scanned before a proper control channel was identified.

Decision 204 determines whether or not the subscriber has found a control channel. If not, scanning continues until a control channel is found, after which the routine proceeds to decision 206 to determine whether the central controller transmitting the control channel supports roaming. As previously mentioned, this is determined by decoding a roaming support code word, which may include additional information such as, for example, the frequencies of the control channels of all adjacent systems supporting roaming, any particular additional features that the central controller supports, the proper connect tones to be used, or other suitable control or status messages. Preferably, the roaming support code word is transmitted periodically by the central controller and after waiting an appropriate amount of time the subscriber may determine that a control channel does not support roaming. In such a case, the routine proceeds to reference letter B where scanning continues in step 202.

When a control channel is found that supports roaming, the routine proceeds to step 208, where the requesting subscriber transmits its unit ID and home system ID to request a roaming ID. If a roaming ID is available it is cross-referenced by the local computer, which then forwards the new roaming ID to the subscriber (step 210). Thereafter, in step 212, the subscriber unit stores the roaming ID and operates within the new system using this ID for all communication activity.

Figure 3:
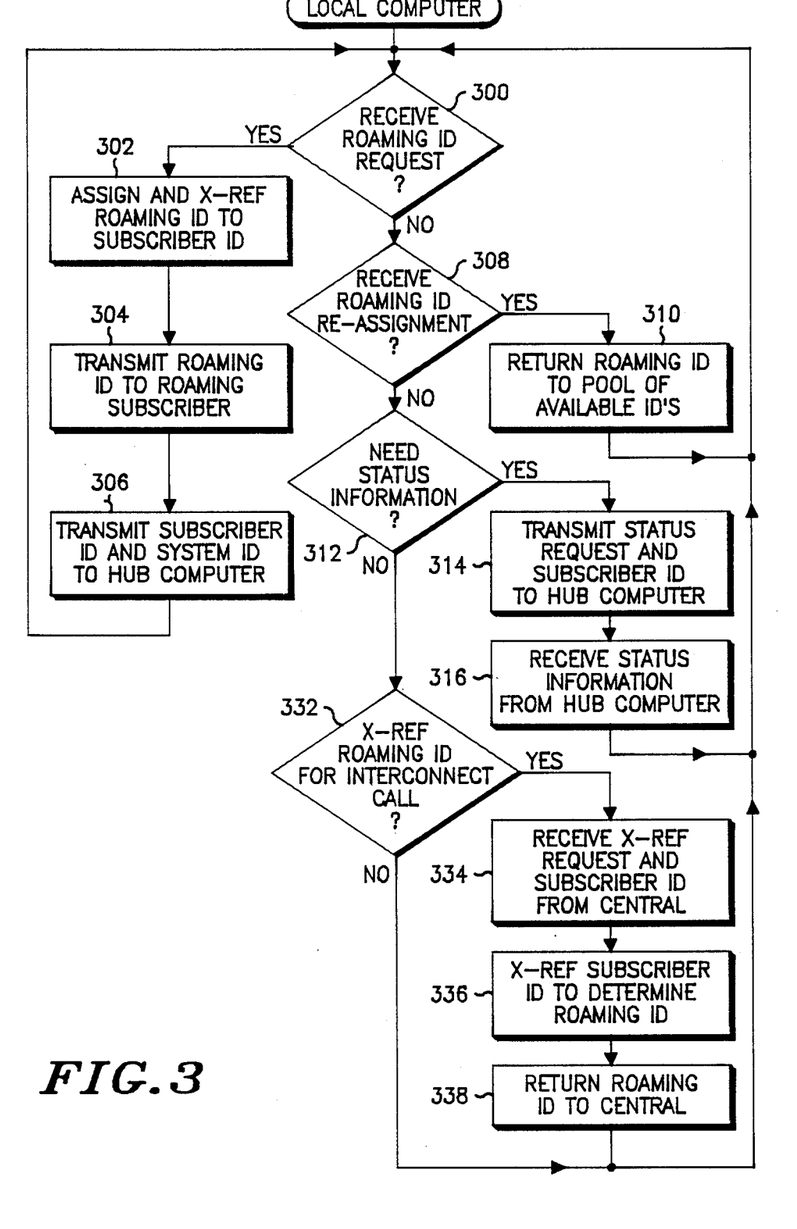
FIG. 3 is a flow diagram illustrating the steps executed by each local computer of FIG. 1.

Referring now to FIG. 3, the steps executed by a local computer (106a-c) are illustrated. In decision 300, the local computer determines whether it has received a roaming ID request. If so, the routine proceeds to step 302, where the local computer assigns and cross references the assigned roaming ID to the subscriber's unit ID and home system ID. In step 304, the local computer (via the central controller) transmits the roaming ID to the roaming subscriber, after which (step 306) the local computer transmits the subscriber ID and the local computer's system ID to the hub computer. The routine then returns to reference letter C. If the local computer has not received a roaming ID request, decision 308 determines whether it has received a roaming ID de-assignment instruction from the hub computer (110). This typically occurs when the subscriber has roamed into yet another system, and the hub computer (110) determines that the subscriber's roaming ID used in the previous system may be reassigned to another subscriber, or to the "pool" (subset) of roaming IDs. Accordingly, in step 310, the local computer returns the roaming ID to the pool of available IDs and returns control to reference letter C.

Decision 312, determines whether the local computer requires status information from the hub computer (110). If so, the local computer transmits a status request and the subscriber unit ID to the hub computer (step 314). The hub computer cross-references the subscriber's unit ID to its roaming ID, and determines the system ID of the trunked system that the subscriber is currently operating within, and returns the status information to the local computer (step 316). Following this, the routine proceeds to reference letter C.

Decision 332 determines whether the central controller has requested a cross-reference to a roaming ID for an interconnect call. Ordinarily this occurs when a landline party calls the central controller via the PSTN. Thus, the central sends a request to its local computer to cross-reference to the subscriber's unit ID to its roaming ID so that the central may establish a telephone interconnect call. Thus, in step 334, the local computer receives the cross-reference request and the subscriber's unit ID from the central controller. In step 336, the local computer cross-references the subscriber's unit ID to determine its roaming ID. Step 338 returns the roaming ID to the central, so that the central may contact the subscriber over the control channel to establish the telephone interconnect call. In this way, the local computer handles the roaming administrative and assignment functions, thereby providing the improved capability afforded by the present invention without significantly overloading the central controller from performing its normal call handling and assignment functions.

Figure 4:
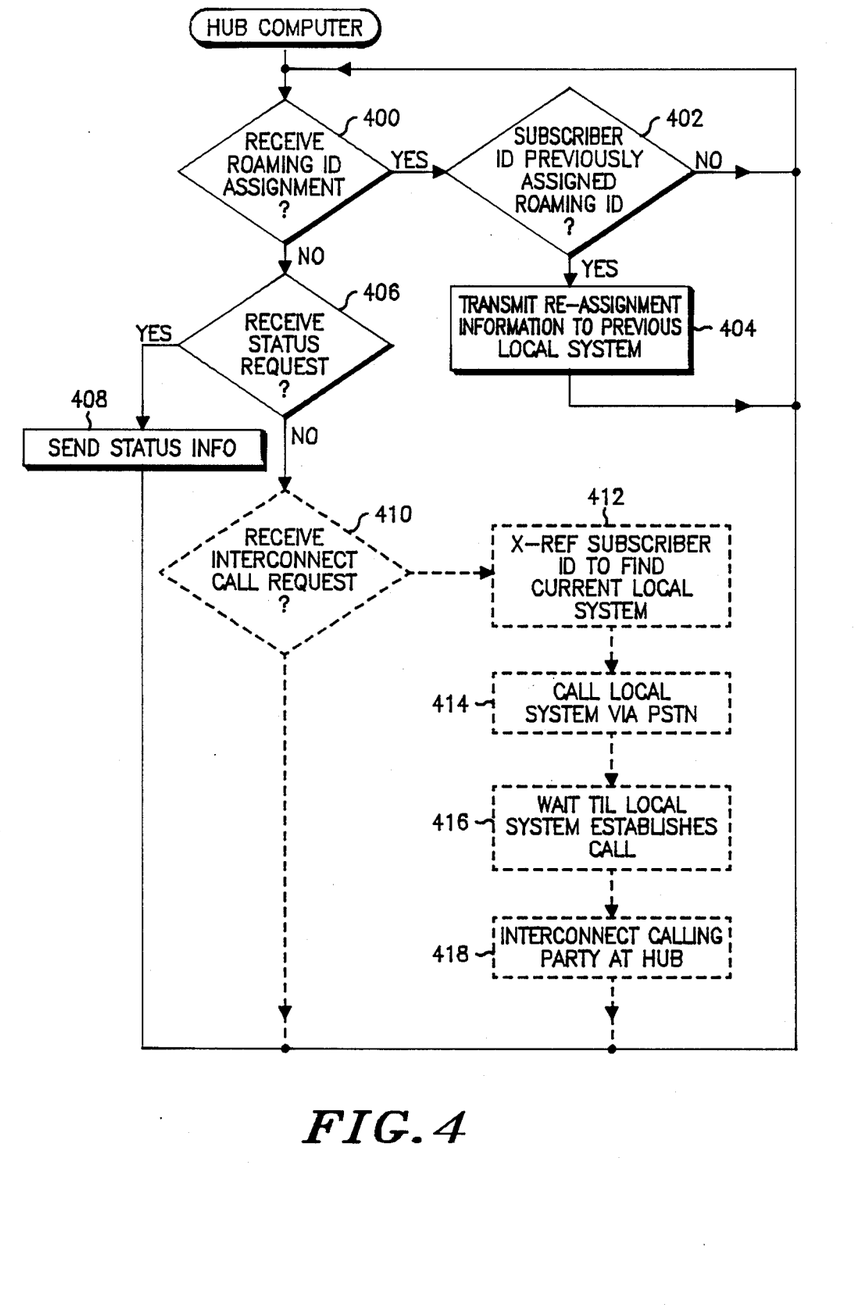
FIG. 4 is a flow diagram illustrating the steps executed by the hub computer of FIG. 1.

Referring now to FIG. 4, the steps executed by the hub computer (110) are illustrated. In step 400, the hub computer determines whether it has received a roaming ID assignment update. If so, decision 402 determines whether the subscribers unit ID has previously been assigned a roaming ID. If so, the hub computer may determine that the subscriber has left one roaming system and has travelled to another. In such case, the hub computer (in step 404) transmits a de-assignment packet to the previous trunking system so that the roaming ID may be reallocated to another roaming subscriber. If the subscriber had not previously been assigned a roaming ID, decision 402 returns control to reference letter D.

Decision 406 determines whether the hub computer has received a status request over the PSTN network or from the local computers. Generally, the status information will comprise a request by a landline party for the current system in which a particular subscriber is operating. Thus, the status request code word ordinarily would contain the unit ID of a subscriber unit. The hub computer may then cross-reference the subscriber's unit ID and return to the requesting party the system identity and the telephone number of the central controller of that system. If the determination of decision 406 is that a status request has been received, step 408 formats and sends the appropriate status information to the requesting party (landline or local computer), after which control is returned to reference letter D.

One alternative to forwarding landline calls to roaming parties comprises the hub computer handling the call interconnection from a central location. Accordingly, as an optional implementation, decision 410 determines whether a telephone interconnect call request has been received. If so, the hub computer cross-references the subscriber's unit ID to find the system ID that the subscriber is currently operating upon (step 412). In step 414, the hub computer calls the local system via the PSTN. In step 416, the hub computer waits until the local system has cross-referenced the unit ID to the roaming ID and establishes a telephone interconnect call with the subscriber. In step 418, the hub computer interconnects the landline party to the central controller where the roamer is operating, to allow the call to take place. After the call is completed, control is again returned to reference letter D.

Figure 5:
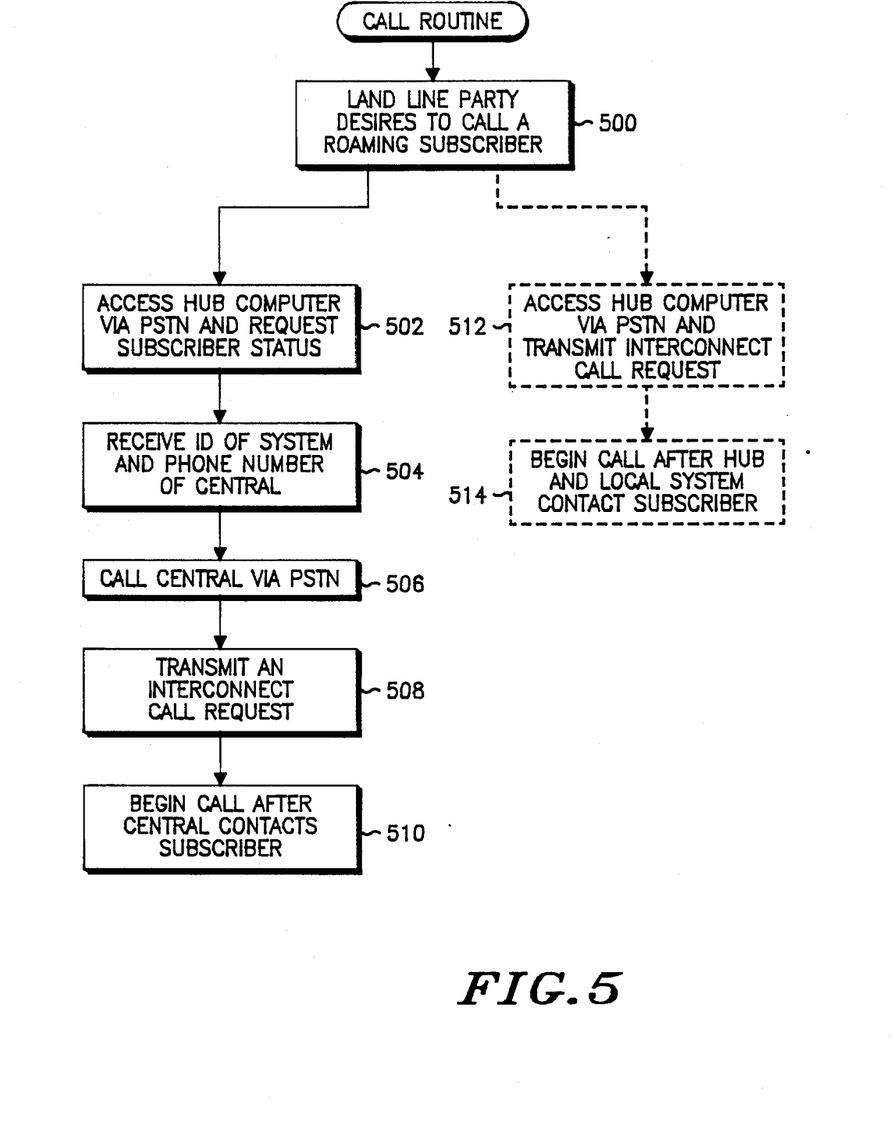
FIG. 5 is a flow diagram illustrating the call routing aspect of the present invention.

Referring now to FIG. 5, the call routing aspect of the present invention are illustrated. Assuming that a landline party desires to call a roaming subscriber unit (step 500) the routine proceeds to step 502, where the landline party accesses the hub computer via the PSTN to request the subscriber's location (i.e., the system ID and phone number of the central the subscriber currently communicates through). In step 504, the landline party receives the subscribers location (roaming system ID) and the telephone number of the central controller from the hub computer. The landline party may then access the central controller where the subscriber is operating via the PSTN (step 506). In step 510, the call commences after the central controller where the subscriber is operating establishes the interconnection with the subscriber. Next the landline party transmits a telephone interconnect call request to the central (step 508).

As an alternate method of establishing interconnect calls, the landline party may access the hub computer (110) via the PSTN and transmit a telephone interconnect call request, which normally would include the subscribers unit ID (step 512). In step 514, the call would begin after the hub computer contacts the local computer and establishes the call (see steps 412–418). In this alternate embodiment, the hub computer (110) is responsible for all interconnections and switching of calls. While it is desirable to centralize this function, the switching and processing requirements for a nationwide system may be so enormous that it is not practical to have one centralized location for switching. For this reason, the interconnect call described in steps 502–510 is preferred.

In either alternative, landline parties need only contact one centralized location to get information or contact a roaming subscriber. Thus, only one telephone number need be remembered, stored or dialed to obtain status information, such as, for example, the roaming subscriber's current system. In this way, a fundamental vehicle location feature is afforded by the present invention. For actual voice or data communication with a roaming subscriber, the long distance link is maintained via the PSTN, which is locally interconnected by a wireless communication channel to provide exchange between the landline party and the roaming subscriber.

What is claimed is:

1. A method for a subscriber unit to roam from a first trunked communication system to a second trunked communication system, comprising the steps of:
  (a) determining that communication with said first trunked communication system has been lost;
  (b) requesting an identification code from said second trunked communication system; and
  (c) operating, thereafter, in said second trunked communication system under said identification code unit communication with said second trunked communication system is lost.

2. The method of claim 1, wherein said step of determining that communication with said first trunked communication system has been lost comprises determining that reception of an information signal from a predetermined communication channel is not practicable due to an unacceptably high error rate.

3. The method of claim 1, wherein said step of requesting an identification code from said second trunked communication system comprises the steps of:
  (b1) scanning for a control channel;
  (b2) transmitting on said control channel a request for said identification code;
  (b3) receiving from said second trunking system said identification code; and
  (b4) storing said identification code.

4. The method of claim 1, wherein said step of requesting an identification code from said second trunked communication system comprises the steps of:
  (b1) scanning for a control channel;
  (b2) receiving a predetermined code word from said control channel;
  (b3) transmitting on said control channel a request for said identification code;
  (b4) receiving from said second trunking system said identification code; and
  (b5) storing said identification code.

5. A network of trunked communication systems constructed and arranged to support subscriber units roaming from system to system, comprising:
  a central computer for communicating with at least two trunked communication systems;
  said at least one trunked communication system, each comprising:
    a plurality of trunked repeaters;
    central control means for allocating said plurality of trunked repeaters among a plurality of subscriber units, and for communicating information with at least some of said plurality of subscriber units on a selected one of said plurality of trunked repeaters, and including means for transmitting a predetermined code word on said selected one of said plurality of trunked repeaters;
    means for communicating with said central computer and for assigning identification codes to roaming subscriber units;
    means for interfacing with a telephone network; and
  said plurality of subscriber units, at least some of which have:
    means for communicating with said central control means of each of said at least two trunked communication systems over said selected one of said plurality of trunked repeaters regardless of whether said selected one of said selected plurality of trunked repeaters used by each of said central control means of said at least two trunked communication systems has a different communication frequency;
    means for determining that communication with said central control means of one of said at least two trunked communication systems is not possible; and
    means for requesting an identification code from a central control means from another of said at least two trunked communication systems.

6. In a network of trunked communication systems constructed and arranged to support subscriber units roaming from system to system and having a central computer for communicating with at least two trunked communication systems, and each of the at least two trunked communication systems having:
  a plurality of trunked repeaters;
  central control means for allocating said plurality of trunked repeaters among a plurality of subscriber units, and for communicating information with at least some of said plurality of subscriber units on a selected one of said plurality of trunked repeaters, and including means for transmitting a predetermined code word on said selected one of said plurality of trunked repeaters;

means for communicating with said central computer and for assigning identification codes to roaming subscriber units; and means for interfacing with a telephone network, a method for establishing an interconnect call with a subscriber unit operating in any of the at least two trunked communication systems, comprising the steps of:

(a) contacting said central computer;

(b) transmitting at least a unit identification of a subscriber unit to said central computer;

(c) receiving an information signal representing a public telephone number associated with the particular trunked communication system that the subscriber unit having said unit identification is operating in;

(d) accessing said particular trunked communication system via said telephone network;

(e) transmitting said unit identification of said subscriber unit to said particular trunked communication system;

(f) communicating with said subscriber unit after said particular trunked communication system determines the identification code currently assigned to said unit identification and establishes a wireless communication channel.

7. In a network of trunked communication systems constructed and arranged to support subscriber units roaming from system to system and having a central computer for communicating with at least two trunked communication systems, wherein each of the at least two trunked communication systems comprises:

a plurality of trunked repeaters;

central control means for allocating said plurality of trunked repeaters among a plurality of subscriber units, and for communicating information with at least some of said plurality of subscriber units on a selected one of said plurality of trunked repeaters, and including means for transmitting a predetermined code word on said selected one of said plurality of trunked repeaters which represents that roaming subscriber units may communicate with said central control means to operate within the particular trunked communication system associated with said central control means;

means for communicating with said central computer and for assigning identification codes to roaming subscriber units; and means for interfacing with a telephone network.

8. In a network of trunked communication systems constructed and arranged to support subscriber units roaming from system to system and having a central computer for communicating with at least two trunked communication systems, and each of the at least two trunked communication systems having:

a plurality of trunked repeaters;

central control means for allocating said plurality of trunked repeaters among a plurality of subscriber units, and for communicating information with at least some of said plurality of subscriber units on a selected one of said plurality of trunked repeaters;

means for communicating with said central computer and for assigning identification codes to roaming subscriber units; and means for interfacing with a telephone network, a signalling method for supporting roaming subscriber units, comprising the steps of:

(a) transmitting a predetermined code on said selected one of said plurality of trunked repeaters, which may be used to identify roaming support capability;

(b) receiving a roaming request code from a subscriber unit;

(c) assigning a roaming identification code to said subscriber unit;

(d) transmitting said roaming identification code to said subscriber unit.

9. The method of claim 8, which includes the step of:
(a1) transmitting an information signal with said predetermined code.

10. The method of claim 8, which includes the step of:
(a1) transmitting an information signal representing the frequency of a control channel used by any adjacent trunked communication system that supports roaming.

11. The method of claim 8, which includes the step of:
(a1) transmitting an information signal representing connect tone frequencies used to communicate over the trunked communication system.

* * * * *

UNITED STATES PATENT AND TRADEMARK OFFICE
CERTIFICATE OF CORRECTION

PATENT NO. : 4,833,701
DATED : May 23, 1989
INVENTOR(S) : Richard A. Comroe and Kenneth J. Zdunek It is certified that error appears in the above-identified patent and that said Letters Patent is hereby corrected as shown below:

Claim 1, column 7, line 61, delete "unit" and insert --until--;

Claim 5, column 8, line 26, after least delete "one" and insert --two--;

column 8, line 26, after communication delete "system" and insert --systems--.

Signed and Sealed this

Thirty-first Day of July, 1990

Attest:

HARRY F. MANBECK, JR.

*Attesting Officer*  *Commissioner of Patents and Trademarks*

UNITED STATES PATENT AND TRADEMARK OFFICE
CERTIFICATE OF CORRECTION

PATENT NO. : 4,833,701
DATED : 5/23/89
INVENTOR(S) : Comroe et al.

It is certified that error appears in the above-identified patent and that said Letters Patent is hereby corrected as shown below:

At Col. 5, lines 31-33, "In such a case, the routine proceeds to reference letter B where scanning continues in step 202." should be --In such a case, the routine proceeds to step 202, where scanning continues.--

At Col. 5, line 54, "reference letter C." should be --step 300.--.

At Col. 5, line 65, "reference letter C." should be --step 300.--.

At Col. 6, line 7, "reference letter C." should be --step 300.--.

At Col. 6, line 40, "reference letter D." should be --step 400.--.

At Col. 6, line 55, "reference letter D." should be --step 400.--.

At Col. 7, line 4, "reference letter D." should be --step 400.--.

In Fig. 1, "118D" should be --108D--.

Signed and Sealed this

Twenty-sixth Day of May, 1992

*Attest:*

DOUGLAS B. COMER

*Attesting Officer*     *Acting Commissioner of Patents and Trademarks*